(12) United States Patent
Zhao et al.

(10) Patent No.: US 11,713,740 B1
(45) Date of Patent: Aug. 1, 2023

(54) HIGH-PRESSURE COMMON RAIL FUEL INJECTOR CAPABLE OF ACHIEVING HIGHLY STABLE INJECTION BASED ON THROTTLING DAMPING ACCOMMODATING EFFECT

(71) Applicant: HARBIN ENGINEERING UNIVERSITY, Heilongjiang (CN)

(72) Inventors: Jianhui Zhao, Heilongjiang (CN); Jingyan Chen, Heilongjiang (CN); Heng Zhang, Heilongjiang (CN); Shuo Chen, Heilongjiang (CN)

(73) Assignee: HARBIN ENGINEERING UNIVERSITY, Harbin (CN)

( * ) Notice: Subject to any disclaimer, the term of this patent is extended or adjusted under 35 U.S.C. 154(b) by 0 days.

(21) Appl. No.: 17/958,910

(22) Filed: Oct. 3, 2022

(30) Foreign Application Priority Data

Feb. 24, 2022 (CN) .......................... 202210170188.9

(51) Int. Cl.
*F02M 55/04* (2006.01)
*F02M 63/02* (2006.01)
(Continued)

(52) U.S. Cl.
CPC .......... *F02M 55/04* (2013.01); *F02M 47/027* (2013.01); *F02M 61/10* (2013.01);
(Continued)

(58) Field of Classification Search
CPC ........... F02M 2200/28; F02M 2200/31; F02M 2200/315; F02M 2200/40; F02M 47/02;
(Continued)

(56) References Cited

U.S. PATENT DOCUMENTS 3,481,542 A * 12/1969 Huber .................. F02M 47/027
 239/96
5,732,679 A * 3/1998 Takahasi .............. F02M 59/366
 123/467
(Continued)

FOREIGN PATENT DOCUMENTS

CN 107035586 A * 8/2017 ........... F02M 47/027
CN 109098901 A * 12/2018 ........... F02M 47/027
(Continued)

*Primary Examiner* — John M Zaleskas
(74) *Attorney, Agent, or Firm* — Dragon Sun Law Firm, PC; Nathaniel Perkins

(57) ABSTRACT

The present disclosure provides a high-pressure common rail fuel injector capable of achieving highly stable injection based on the throttling damping-accommodating effect in the present disclosure, comprising a fuel injector housing, a fuel pipe connector, an accumulator chamber, a fuel chamber control valve, a pressure fluctuation absorption assembly, a control valve assembly and a nozzle assembly; the accumulator chamber is installed in the fuel injector housing, and the fuel pipe connector is installed above the accumulator chamber; the fuel chamber control valve, the pressure fluctuation absorption assembly and the control valve assembly are installed in the fuel injector housing, and the nozzle assembly is arranged below the control valve assembly; and the accumulator chamber is separated into a main accumulator chamber, an auxiliary accumulator chamber and a fuel-return accumulator chamber.

8 Claims, 5 Drawing Sheets

(51) Int. Cl.
*F02M 61/10* (2006.01)
*F02M 47/02* (2006.01)
*F02M 61/16* (2006.01)

(52) U.S. Cl.
CPC ......... *F02M 63/0275* (2013.01); *F02M 61/16* (2013.01); *F02M 2200/28* (2013.01); *F02M 2200/315* (2013.01); *F02M 2200/40* (2013.01)

(58) Field of Classification Search
CPC .... F02M 47/027; F02M 55/008; F02M 55/04; F02M 61/10; F02M 61/16; F02M 63/0275
See application file for complete search history.

(56) References Cited

U.S. PATENT DOCUMENTS

| | | | | |
|---|---|---|---|---|
| 6,073,862 | A * | 6/2000 | Touchette | F02M 21/0251 239/96 |
| 6,336,598 | B1 * | 1/2002 | Touchette | F02M 45/086 239/408 |
| 6,340,121 | B1 * | 1/2002 | Lambert | F02M 61/045 239/533.12 |
| 6,422,199 | B1 * | 7/2002 | Buckley | F02M 47/027 239/444 |
| 2002/0125339 | A1 * | 9/2002 | Perr | F02M 45/04 239/96 |
| 2003/0015599 | A1 * | 1/2003 | Carroll, III | F02M 45/086 239/96 |
| 2003/0066509 | A1 * | 4/2003 | Shafer | F02M 57/025 123/27 R |
| 2003/0127074 | A1 * | 7/2003 | Egler | F02M 63/0225 123/446 |
| 2003/0136382 | A1 * | 7/2003 | Egler | F02M 61/16 123/446 |
| 2003/0168528 | A1 * | 9/2003 | Egler | F02M 55/04 239/533.2 |
| 2004/0000600 | A1 * | 1/2004 | Peters | F02M 47/027 239/96 |
| 2004/0050367 | A1 * | 3/2004 | Kurrle | F02M 55/00 123/472 |
| 2004/0061002 | A1 * | 4/2004 | Egler | F02M 47/027 239/533.2 |
| 2004/0187848 | A1 * | 9/2004 | Hlousek | F02M 63/0225 123/456 |
| 2005/0045150 | A1 * | 3/2005 | Furukubo | F02M 63/0031 123/447 |
| 2005/0263621 | A1 * | 12/2005 | Brenk | F02M 47/027 239/533.2 |
| 2006/0042597 | A1 * | 3/2006 | Magel | F02M 47/027 123/446 |
| 2006/0096578 | A1 * | 5/2006 | Lehtonen | F02M 55/025 123/456 |
| 2006/0202053 | A1 * | 9/2006 | Gibson | F02M 63/0007 239/585.1 |
| 2006/0202140 | A1 * | 9/2006 | Magel | F02M 61/205 251/30.01 |
| 2006/0243252 | A1 * | 11/2006 | Eisenmenger | F02M 63/0045 239/585.5 |
| 2007/0199539 | A1 * | 8/2007 | Lennox | F02M 47/027 123/304 |
| 2008/0156290 | A1 * | 7/2008 | Ochiai | F02M 55/04 137/493.2 |
| 2011/0108631 | A1 * | 5/2011 | Mumford | F02D 19/0642 239/429 |
| 2014/0123937 | A1 * | 5/2014 | Wickstone | F02D 19/0694 123/299 |
| 2014/0252108 | A1 * | 9/2014 | Cavanagh | F02M 47/027 239/533.2 |
| 2014/0252109 | A1 * | 9/2014 | Cavanagh | F02M 63/0056 239/533.2 |
| 2015/0167609 | A1 * | 6/2015 | Harcombe | F02M 61/042 239/533.2 |
| 2015/0219054 | A1 * | 8/2015 | Peavler | F02M 69/04 123/446 |
| 2016/0115928 | A1 * | 4/2016 | Cavanagh | F02M 63/0005 123/456 |
| 2017/0356391 | A1 * | 12/2017 | Singh | F02M 43/04 |
| 2018/0045153 | A1 * | 2/2018 | Harcombe | F02M 63/0007 |
| 2020/0191104 | A1 * | 6/2020 | Tanada | F02M 63/0029 |
| 2021/0270203 | A1 * | 9/2021 | Kanno | F02D 41/3845 |

FOREIGN PATENT DOCUMENTS

| | | | | |
|---|---|---|---|---|
| CN | 109236521 | A * | 1/2019 | |
| CN | 109236526 | A * | 1/2019 | |
| CN | 109236527 | A * | 1/2019 | ............ F02M 55/02 |
| CN | 109236532 | A * | 1/2019 | .......... F02M 51/061 |
| CN | 109253002 | A * | 1/2019 | |
| CN | 109253003 | A * | 1/2019 | |
| CN | 110645128 | A * | 1/2020 | |
| CN | 113790116 | A * | 12/2021 | ............ F02M 26/19 |
| CN | 113790117 | A * | 12/2021 | |
| DE | 102005022698 | A1 * | 11/2006 | ............ F02M 55/04 |
| EP | 1435455 | A1 * | 7/2004 | ............ F02M 55/02 |
| EP | 1947324 | A2 * | 7/2008 | .......... F02M 55/002 |
| JP | H05196190 | A * | 8/1993 | |
| JP | 2007239735 | A * | 9/2007 | .......... F02M 45/086 |
| WO | WO-2011132832 | A1 * | 10/2011 | .......... F02M 45/086 |
| WO | WO-2013086427 | A1 * | 6/2013 | |
| WO | WO-2018141546 | A1 * | 8/2018 | ............ F02M 26/19 |

* cited by examiner

HIGH-PRESSURE COMMON RAIL FUEL INJECTOR CAPABLE OF ACHIEVING HIGHLY STABLE INJECTION BASED ON THROTTLING DAMPING ACCOMMODATING EFFECT

CROSS-REFERENCE TO RELATED APPLICATION

This application claims priority from the Chinese patent application 202210170188.9 filed Feb. 24, 2022, the content of which is incorporated herein in the entirety by reference.

TECHNICAL FIELD

The present disclosure relates to a diesel engine, in particular to a high-pressure common rail system for the diesel engine.

BACKGROUND

A fuel injector serves as an important component of a high-pressure common rail (hereinafter referred to as HPCR) fuel injection system, and its fuel injection characteristic directly affects the economy and emission performance of a diesel engine matched with the HPCR fuel injection system. The fuel injector in the HPCR system often needs to inject fuel for multiple times to meet normal operating requirements of the diesel engine. However, the interval between two adjacent injections is short during multiple injections, and what the fuel injector injects subsequently will be reduced greatly in accuracy as a result of influence of fuel pressure fluctuation caused by the previous injection, which leads to poor combustion performance of the fuel.

SUMMARY

The present disclosure is intended to provide a high-pressure common rail fuel injector capable of achieving highly stable injection based on a throttling damping-accommodating effect, by which the pressure fluctuation of fuel can be absorbed effectively to improve the stability of the common rail fuel injector.

The objective of the present disclosure is achieved in this way:

The high-pressure common rail fuel injector capable of achieving highly stable injection based on the throttling damping-accommodating effect in the present disclosure, comprising a fuel injector housing, a fuel pipe connector, an accumulator, a fuel chamber control valve, a pressure fluctuation absorption assembly, a control valve assembly and a nozzle assembly; the accumulator is installed in the fuel injector housing, and the fuel pipe connector is installed above the accumulator; the fuel chamber control valve, the pressure fluctuation absorption assembly and the control valve assembly are installed in the fuel injector housing, and the nozzle assembly is arranged below the control valve assembly; and the accumulator is separated into a main accumulator chamber, an auxiliary accumulator chamber and a fuel-return accumulator chamber.

The high-pressure common rail fuel injector of the present disclosure may further include that:

1. The fuel chamber control valve includes an armature locating seat, a valve rod locating seat, a fuel chamber control valve armature and a fuel chamber control valve rod; the fuel chamber control valve armature is located in the armature locating seat, and installed on a top of the fuel chamber control valve rod, and the fuel chamber control valve coil is arranged above the fuel chamber control valve armature; a fuel chamber control valve spring is arranged in the fuel chamber control valve coil, and the fuel chamber control valve rod penetrates through the armature locating seat, and extends into the valve rod locating seat; a valve rod fuel inlet line and a valve rod fuel outlet line are arranged in the armature locating seat, and the valve rod fuel inlet line is connected with the main accumulator chamber through a first fuel inlet line and a first fuel inlet check valve; the valve rod fuel outlet line is communicated with a second fuel inlet line, and an upper fuel chamber and a lower fuel chamber are arranged in the middle of the fuel chamber control valve rod; the upper fuel chamber is communicated with the lower fuel chamber through the valve rod fuel chamber, and the upper fuel chamber is in mechanical fitting with the valve rod fuel inlet line; the lower fuel chamber is in mechanical fitting with the valve rod fuel outlet line, and the auxiliary chamber fuel inlet line is arranged in the valve rod locating seat; and the auxiliary chamber fuel inlet line is connected with the auxiliary accumulator chamber through a third fuel inlet check valve.

2. The pressure fluctuation absorption assembly includes a fuel outlet top cap, a fuel outlet gasket, a damping-accommodating type piston sleeve, a fuel inlet gasket and a fuel inlet top cap which are arranged from top to bottom, and a fuel outlet buffer chamber is formed in the fuel outlet top cap; the fuel outlet buffer chamber is connected with the fuel-return accumulator chamber through a buffer chamber fuel outlet passage as well as a fourth fuel inlet check valve and a second fuel-return line, and fuel outlets are formed in the fuel outlet gasket; fuel inlets are formed in the fuel inlet gasket, and a throttle piston and a fixing rod are arranged in the damping-accommodating type piston sleeve; an upper end of the fixing rod is connected with the fuel outlet gasket, and a lower end of the fixing rod penetrates through the throttle pistons, and is connected with the fuel inlet gasket; a piston reset spring sleeves the fixing rod, and the fuel outlet gasket and the throttle piston are arranged at two ends of the piston reset spring respectively; a first variable accommodating chamber is formed among the throttle piston, the damping-accommodating type piston sleeve and the fuel inlet gasket, and a second variable accommodating chamber is formed among the throttle piston, the damping-accommodating type piston sleeve and the fuel outlet gasket; piston throttle orifices are formed in the throttle piston, and a fuel inlet buffer chamber is formed in the fuel inlet top cap; throttle orifice fuel outlet passages are arranged at an upper end of the damping-accommodating type piston sleeve, and throttle orifice fuel inlet passages are arranged at a lower end of the damping-accommodating type piston sleeve; a first annular accommodating chamber, a second annular accommodating chamber, first throttle orifices, second throttle orifices and third throttle orifices are formed in the middles of the damping-accommodating type piston sleeves respectively, and the first throttle orifices are communicated with the first annular accommodating chamber and the throttle orifice fuel inlet passages respectively; and the second throttle orifices are communicated with the first annular accommodating chamber and the second annular accommodating chamber respectively, and the third throttle orifices are communicated with the second annular accommodating chamber and the throttle orifice fuel outlet passages respectively.

3. The control valve assembly includes a control valve upper valve seat, a control valve armature, a valve rod, a control valve lower valve seat and a control chamber top cap, and the control valve upper valve seat, the control valve lower valve seat and the control chamber top cap are arranged from top to bottom; the control valve armature is located in the control valve lower valve seat, and a control valve coil is located in the control valve upper valve seat, and located above the control valve armature; a control valve reset spring is arranged in the control valve coil, and an upper end of the valve rod is connected with the control valve armature; a control chamber fuel-return accumulator chamber and a control chamber fuel-return throttle orifice are formed in the control chamber top cap, and a lower end of the valve rod is located in the control chamber fuel-return accumulator chamber; and a ball valve is arranged between the valve rod and the control chamber fuel-return throttle orifice.

4. The nozzle assembly includes a injector body, a needle valve, a needle valve locating seat, a control sleeve locating seat and a control chamber sleeve, and the control sleeve locating seat, the needle valve locating seat and the injector body are arranged from top to bottom; the needle valve is located in the control sleeve locating seat, the needle valve locating seat and the injector body, and a fuel groove is formed between the needle valve and the injector body; the fuel groove is communicated with a fuel inlet buffer chamber of the pressure fluctuation absorption assembly, and the fuel groove is communicated with a second fuel inlet line through a second fuel inlet check valve; the control chamber sleeve is located below the control chamber top cap, and a control chamber is formed by the control chamber top cap, the control chamber sleeve and the needle valve; and a part of the needle valve located in the needle valve locating seat is sleeved by a needle valve spring.

5. Diameters of the first throttle orifices, the second throttle orifices and the third throttle orifices in the damping-accommodating type piston sleeve are equal.

6. The diameter of the piston throttle orifices is larger than that of the first throttle orifices in the side wall of the damping-accommodating type piston sleeve.

7. In case of small pressure fluctuation, fuel in the fuel groove flows into the fuel inlet buffer chamber through the first fuel-return line, and flows into the first variable accommodating chamber through the fuel inlets; the throttle orifice fuel inlet passages are blocked by side walls of the throttle piston, and the throttle orifice fuel inlet passages are not communicated with the first variable accommodating chamber; the fuel in the first variable accommodating chamber can only flow into the second variable accommodating chamber through the piston throttle orifices in the throttle piston; as a result, the pressure fluctuation of the fuel is absorbed under buffer action of the inherent mass of the throttle piston and throttling damping action of the piston throttle orifices in the throttle piston; and finally the fuel flows into the fuel outlet buffer chamber through the fuel outlets, and flows into the fuel-return accumulator chamber through the buffer chamber fuel outlet passage and the second fuel-return line.

8. In case of large pressure fluctuation, the fuel in the fuel inlet buffer chamber flows into the first variable accommodating chamber through the fuel inlets, and the throttle orifice fuel inlet passages are not blocked by the side walls of the throttle piston; the throttle orifice fuel inlet passages are communicated with the first variable accommodating chamber, and the fuel flows into the second variable accommodating chamber in two paths; one path of fuel flows into the second variable accommodating chamber through the piston throttle orifices in the throttle piston, and the pressure fluctuation of the fuel is absorbed under the buffer action of the inherent mass of the throttle piston and the throttling damping action of the piston throttle orifices; the other path of fuel flows into the first annular accommodating chamber through the throttle orifice fuel inlet passages and the first throttle orifices, and primary absorption of the pressure fluctuation in the fuel line is achieved under the damping action of the first throttle orifices; the fuel located in the first annular accommodating chamber flows into the second annular accommodating chamber through the second throttle orifices, and secondary absorption of the pressure fluctuation is achieved under the damping action of the second throttle orifices; after completion of secondary absorption of the pressure fluctuation, the fuel flows into the second variable accommodating chamber through the third throttle orifices and the throttle orifice fuel outlet passages, and third-time absorption of the pressure fluctuation is achieved under the damping action of the third throttle orifices; and finally, the fuel flows into the buffer chamber fuel outlet passage through the fuel outlets communicated with the second variable accommodating chamber, and the fuel outlet buffer chamber, and flows into the fuel-return accumulator chamber through the second fuel-return line.

The present disclosure has the advantages that the pressure fluctuation absorption assembly of the present disclosure is of such structure that the throttle piston is combined with the damping-accommodating type piston sleeve with the side wall having a multi-stage damping-accommodating type structure; in case of small pressure fluctuation, the pressure fluctuation is absorbed under the buffer action of the throttle piston and the damping action of the piston throttle orifices, and in case of large pressure fluctuation, the fuel lines on the side walls of the damping-accommodating type piston sleeve are communicated, and the first throttle orifices, the second throttle orifices and the third throttle orifices in the side walls of the damping-accommodating type piston sleeve participate in the absorption process of the pressure fluctuation; and therefore the pressure fluctuation absorption of the fuel is more efficient under the damping action of the first throttle orifices, the second throttle orifices and the third throttle orifices, and the stability of the fuel injection performance is fully guaranteed.

DETAILED DESCRIPTION OF THE PRESENT DISCLOSURE

Figure 1:
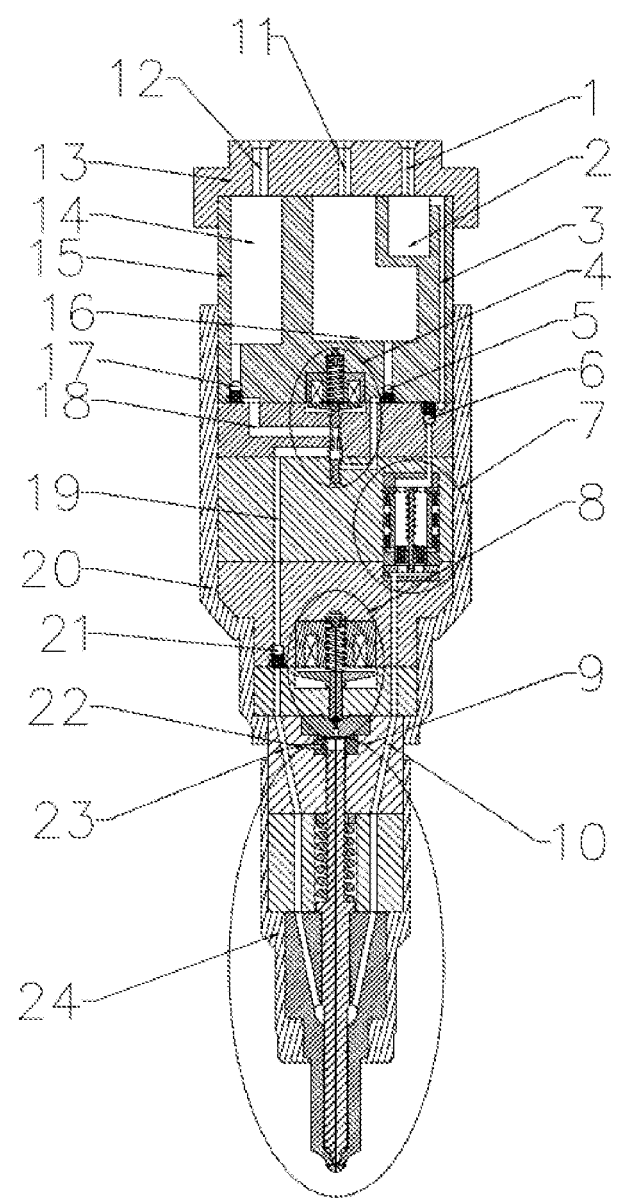
FIG. 1 is a structural schematic diagram of the present disclosure.
Figure 2:
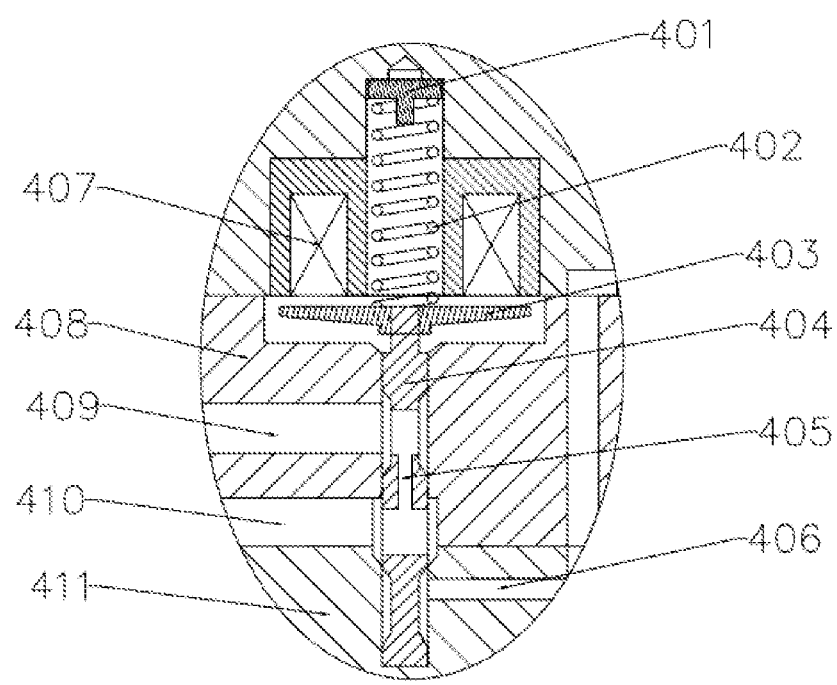
FIG. 2 is a structural schematic diagram of a fuel chamber control valve.
Figure 3:
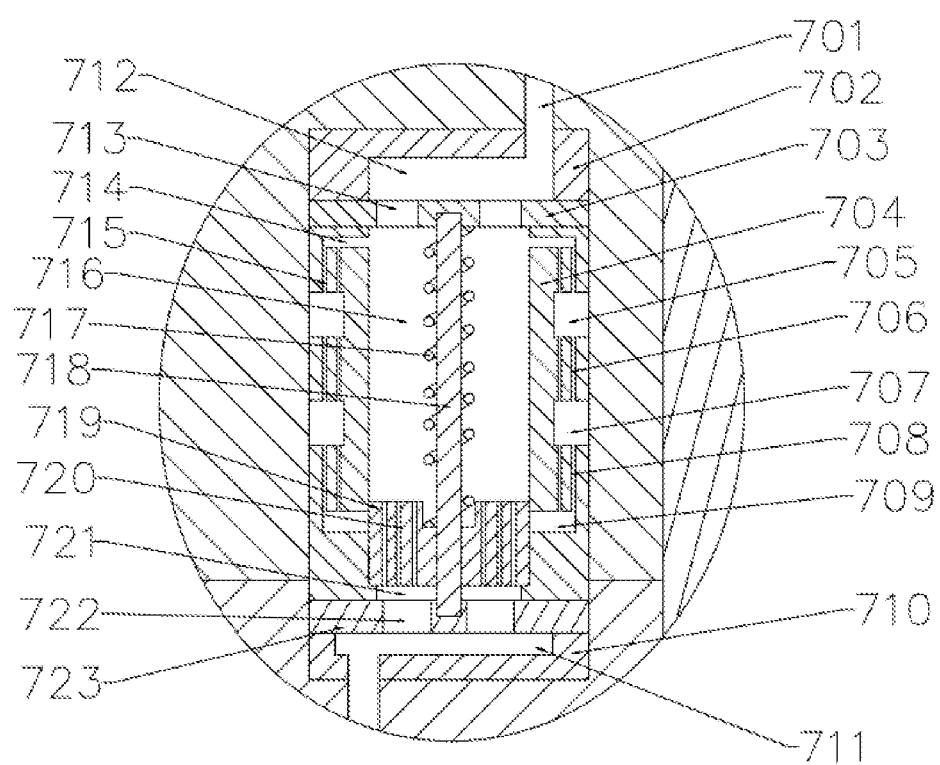
FIG. 3 is a structural schematic diagram of a pressure fluctuation absorption assembly.
Figure 4:
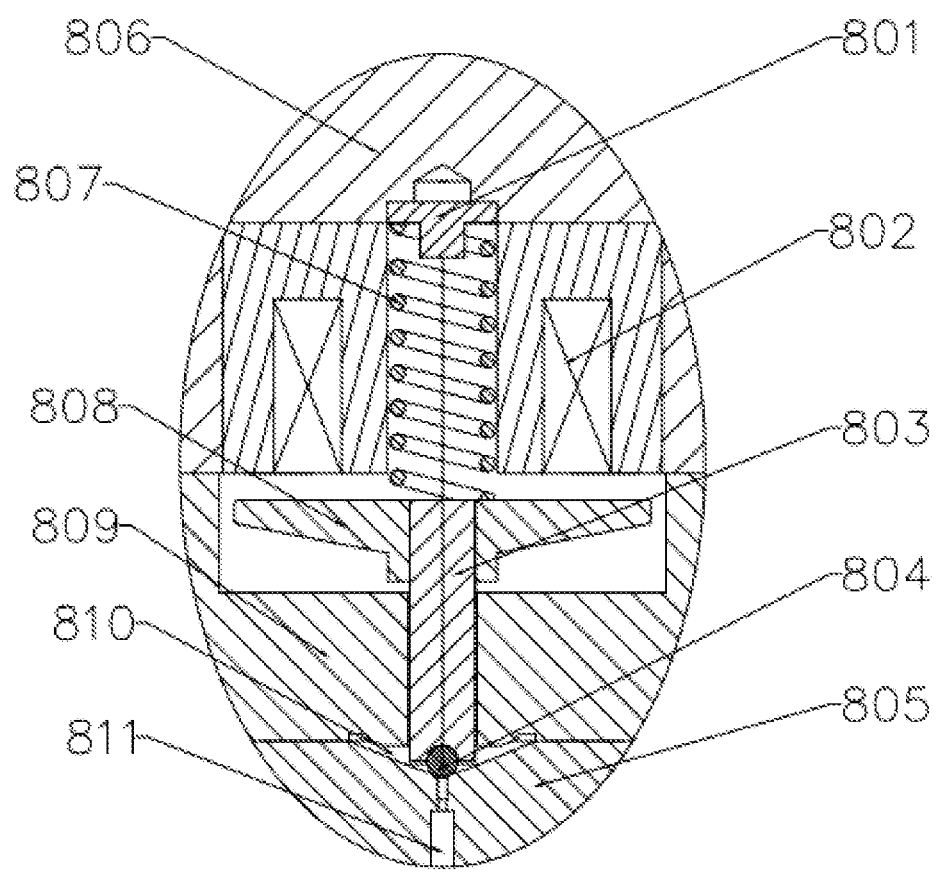
FIG. 4 is a structural schematic diagram of a fuel injection control valve.
Figure 5:
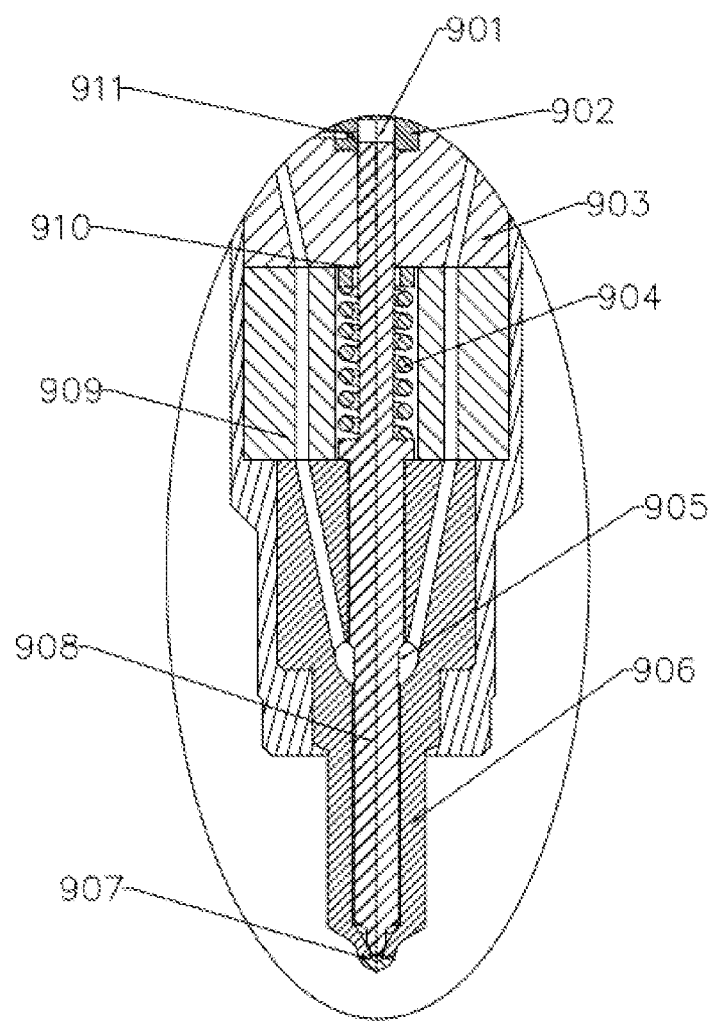
FIG. 5 is a structural schematic diagram of a nozzle assembly.

The present disclosure will be described in more detail with reference to drawings and examples:

Referring to FIG. 1 to FIG. 5, the high-pressure common rail fuel injector includes a fuel pipe connector 13, an accumulator 15, a fuel chamber control valve 4, a pressure fluctuation absorption assembly 7, a fuel injection control valve 8, a nozzle assembly 9, a fuel injector housing 20 and a nozzle cap nut 24; an upper end of the accumulator 15 is connected with the fuel pipe connector 13, and the fuel chamber control valve 4 is arranged below the accumulator 15; the pressure fluctuation absorption assembly 7, the fuel injection control valve 8 and the nozzle assembly 9 are arranged below the fuel chamber control valve 4 from top to bottom in sequence, and fixed by the fuel injector housing 20 and the nozzle cap nut 24; a first fuel inlet line 18 is connected with a first fuel inlet check valve 17, and a second fuel inlet check valve 21 is connected with a second fuel inlet line 19 and a third fuel inlet line 23; the pressure fluctuation absorption assembly 7 is communicated with the nozzle assembly 9 by a first fuel-return line 10; a main accumulator chamber 14, an auxiliary accumulator chamber 16, a fuel-return accumulator chamber 2, a second fuel-return line 3, a first fuel inlet check valve 17, a third fuel inlet check valve 5, and a fourth fuel inlet check valve 6 are arranged in the accumulator 15, and the second fuel-return line 3 is communicated with the fuel-return accumulator chamber 2; a main chamber fuel inlet orifice 12 communicated with the main accumulator chamber 14, an auxiliary chamber fuel inlet orifice 11 communicated with the auxiliary accumulator chamber 16, and a fuel-return orifice 1 communicated with the fuel-return accumulator chamber 2 are formed in the fuel pipe connector 13, and the second fuel inlet line 19 is connected with the third fuel inlet line 23 by the second fuel inlet check valve 21. The diameter of first throttle orifices in damping-accommodating type piston sleeve is equal to that of second throttle orifices, and the diameter of the second throttle orifices is equal to that of third throttle orifices. The diameter of piston throttle orifices is larger than that of the first throttle orifices in side walls of the damping-accommodating type piston sleeve.

The fuel chamber control valve 4 includes a fuel chamber control valve rod 404, a fuel chamber control valve armature 403, a fuel chamber control valve coil 407, a fuel chamber control valve spring 402, a fuel chamber control valve gasket 401, an armature locating seat 408 and a valve rod locating seat 411; a valve rod fuel inlet line 409 and an auxiliary chamber fuel inlet line 406 are arranged in the armature locating seat 408 and the valve rod locating seat 411 respectively, and a valve rod fuel outlet line 410 is formed between the valve rod fuel inlet line and the auxiliary chamber fuel inlet line; a valve rod fuel chamber 405 is formed in the fuel chamber control valve rod 404; an upper chamber fuel port of the valve rod fuel chamber 405 is communicated with the valve rod fuel inlet line 409, and a lower chamber fuel port is communicated with the valve rod fuel outlet line 410; and break-make between the auxiliary chamber fuel inlet line 406 and the valve rod fuel outlet line 410 is achieved through movement of the fuel chamber control valve rod 404.

The pressure fluctuation absorption assembly 7 includes a fuel outlet top cap 702, a fuel outlet gasket 703, the damping-accommodating type piston sleeve 704, a fuel inlet top cap 710, a piston reset spring 717, a fixing rod 718, a throttle piston 719 and a fuel inlet gasket 723; a fuel outlet buffer chamber 712 is formed by the fuel outlet top cap 702 and the fuel outlet gasket 703, and an upper side of the fuel outlet buffer chamber 712 is communicated with a buffer chamber fuel outlet passage 701; fuel outlets 713 are formed in the fuel outlet gasket 703, and throttle orifice fuel outlet passages 714, third throttle orifices 715, a second annular accommodating chamber 705, second throttle orifices 706, a first annular accommodating chamber 707, first throttle orifices 708 and throttle orifice fuel inlet passages 709 are formed in the damping-accommodating type piston sleeve 704; piston throttle orifices 720 are formed in the throttle piston 719, and fuel inlets 722 are formed in the fuel inlet gasket 723; a second variable accommodating chamber 716 is formed by the fuel outlet gasket 703, the damping-accommodating type piston sleeve 704 and the throttle piston 719, and a first variable accommodating chamber 721 is formed by the fuel inlet gasket 723, the throttle piston 719 and the damping-accommodating type piston sleeve 704; and a fuel inlet buffer chamber 711 is formed by the fuel inlet gasket 723 and the fuel inlet top cap 710.

The control valve assembly 8 includes a control valve spring gasket 801, a control valve coil 802, a valve rod 803, a ball valve 804, a control chamber top cap 805, a control valve upper valve seat 806, a control valve reset spring 807, a control valve armature 808 and a control valve lower valve seat 809; a control chamber fuel-return throttle orifice 811 is formed in the control chamber top cap 805, and a control chamber fuel-return accumulator chamber 810 is formed by the control valve lower valve seat 809 and the control chamber top cap 805; and break-make between the control chamber fuel-return accumulator chamber 810 and the control chamber fuel-return throttle orifice 811 is controlled by the ball valve 804.

The nozzle assembly 9 includes a control sleeve locating seat 903, a needle valve locating seat 909, an injector body 906, a control chamber sleeve 902, a needle valve spring gasket 910, a needle valve spring 904 and a needle valve 908; a control chamber 901 is formed by the needle valve 908 and the control chamber sleeve 902, and a nozzle 907 is arranged at a lower end of the injector body 906; and a control chamber fuel inlet throttle orifice 911 and a fuel groove 905 are formed in the control chamber sleeve 902, and the control chamber fuel inlet throttle orifice 911 is communicated with the control chamber 901.

Referring to FIG. 1 to FIG. 5, the working principle of the present disclosure is as follows: fuel flows into the fuel injector in two paths, one path of fuel enters the auxiliary accumulator chamber 16 through the auxiliary chamber fuel inlet orifice 11 in the fuel pipe connector 13; the fuel chamber control valve coil 407 in the fuel chamber control valve 4 is not powered on, the fuel line between the auxiliary chamber fuel inlet line 406 and the valve rod fuel outlet line 410 is separated by the fuel chamber control valve rod 404, and the fuel entering the auxiliary accumulator chamber 16 can only be accumulated in the auxiliary accumulator chamber 16 and the auxiliary chamber fuel inlet line 406; when the fuel chamber control valve coil 407 is powered on, the fuel chamber control valve rod 404 moves upwards so that the auxiliary chamber fuel inlet line 406 is communicated with the valve rod fuel outlet line 410, and high-pressure fuel accumulated in the auxiliary chamber fuel inlet line 406 and the fuel in the valve rod fuel chamber 405 flow into the valve rod fuel outlet line 410 together; the other path of fuel enters the main accumulator chamber 14 through the main chamber fuel inlet orifice 12 in the fuel pipe connector 13; the fuel in the main accumulator chamber 14 enters the valve rod fuel inlet line 409 through the first fuel inlet line 18 arranged there below and communicated with the main accumulator chamber 14, and enters the valve rod fuel outlet line 410 through the valve rod fuel chamber 405 communicated with the valve rod fuel inlet line 409; the fuel flows through the second fuel inlet line 19 and the second fuel inlet check valve 21 which are communicated with the valve rod fuel outlet line 410, and then flows into the third fuel inlet line 23; as a result, the fuel in the third fuel inlet line 23 is divided into two paths, one path of fuel flows into the fuel groove 905 along the control chamber fuel inlet line 22, and the other path of fuel flows into the control chamber 901 along the control chamber fuel inlet line 22 and the control chamber fuel inlet throttle orifice 911 which are communicated with the third fuel inlet line 23; when the control valve coil 802 is not powered on, the ball valve 804 is tightly pressed by the valve rod 803 under the action of an elastic force of the control valve reset spring 807, and therefore the control chamber fuel-return accumulator chamber 810 is not communicated with the control chamber fuel-return throttle orifice 811; the fuel can only be accumulated in the control chamber 901 and the control chamber fuel-return throttle orifice 811 communicated with the control chamber 901; at the moment, the needle valve 908 is tightly pressed at a nozzle fuel inlet under pressure of the high-pressure fuel in the control chamber 901 and the elastic force of the needle valve spring 904, and the nozzle is in the non-injection state; when the control valve coil 802 is powered on, the valve rod 803 moves upwards so that the valve rod 803 is jacked up under the pressure action of the high-pressure fuel in the control chamber fuel-return throttle orifice 811; therefore, the control chamber fuel-return throttle orifice 811 is communicated with the control chamber fuel-return accumulator chamber 810, and the fuel in the control chamber 901 is discharged to reduce the pressure; and as the fuel pressure in the control chamber 901 is decreased gradually, the needle valve 908 moves upwards, the fuel starts to pass though the nozzle 907, and the fuel injector starts to inject the fuel.

In case of small pressure fluctuation, the fuel in the fuel groove 905 flows into the fuel inlet buffer chamber 711 through the first fuel-return line 10, and flows into the first variable accommodating chamber 721 through the fuel inlets 722; the throttle orifice fuel inlet passages 709 are blocked by side walls of the throttle piston 719, and the throttle orifice fuel inlet passages 709 are not communicated with the first variable accommodating chamber 721; the fuel in the first variable accommodating chamber 721 can only flow into the second variable accommodating chamber 716 through the piston throttle orifices 720 in the throttle piston 719; as a result, the pressure fluctuation of the fuel is absorbed under buffer action of the inherent mass of the throttle piston 719 and the throttling damping action of the piston throttle orifices 720 in the throttle piston 719; and finally the fuel flows into the fuel outlet buffer chamber 712 through the fuel outlets 713, and flows into the fuel-return accumulator chamber 2 through the buffer chamber fuel outlet passage 701 and the second fuel-return line 3.

In case of large pressure fluctuation, the fuel in the fuel inlet buffer chamber 711 flows into the first variable accommodating chamber 721 through the fuel inlets 722, and the throttle orifice fuel inlet passages 709 are not blocked by side walls of the throttle piston 719; the throttle orifice fuel inlet passages 709 are communicated with the first variable accommodating chamber 721, and the fuel flows into the second variable accommodating chamber 716 in two paths; one path of fuel flows into the second variable accommodating chamber 716 through the piston throttle orifices 720 in the throttle piston 719, and the pressure fluctuation of the fuel is absorbed under the buffer action of the inherent mass of the throttle piston 719 and the throttling damping action of the piston throttle orifices 720; the other path of fuel flows into the first annular accommodating chamber 707 through the throttle orifice fuel inlet passages 709 and the first throttle orifices 708, and primary absorption of the pressure fluctuation in the fuel line is achieved under the damping action of the first throttle orifices 708; the fuel located in the first annular accommodating chamber 707 flows into the second annular accommodating chamber 705 through the second throttle orifices 706, and secondary absorption of the pressure fluctuation is achieved under the damping action of the second throttle orifices 706; after completion of secondary absorption of the pressure fluctuation, the fuel flows into the second variable accommodating chamber 716 through the third throttle orifices 715 and the throttle orifice fuel outlet passages 714, and third absorption of the pressure fluctuation is achieved under the damping action of the third throttle orifices 715; and finally, the fuel flows into the buffer chamber fuel outlet passage 701 through the fuel outlet 713 communicated with the second variable accommodating chamber 716, and the fuel outlet buffer chamber 712, and flows into the fuel-return accumulator chamber 2 through the second fuel-return line 3.

What is claimed is:

1. A high-pressure common rail fuel injector capable of achieving highly stable injection, comprising a fuel injector housing (20), a fuel pipe connector (13), an accumulator (15), a fuel chamber control valve (4), a pressure fluctuation absorption assembly (7), a control valve assembly (8) and a nozzle assembly (9), the accumulator (15) being installed in the fuel injector housing (20), and the fuel pipe connector (13) being installed above the accumulator (15); the fuel chamber control valve (4), the pressure fluctuation absorption assembly (7) and the control valve assembly (8) being installed in the fuel injector housing (20), and the nozzle assembly (9) being arranged below the control valve assembly (8); and the accumulator (15) being divided into a main accumulator chamber (14), an auxiliary accumulator chamber (16) and a fuel-return accumulator chamber (2);

wherein the fuel chamber control valve (4) comprises an armature locating seat (408), a valve rod locating seat (411), a fuel chamber control valve armature (403) and a fuel chamber control valve rod (404); the fuel chamber control valve armature (403) being located in the armature locating seat (408), and installed on a top of the fuel chamber control valve rod (404), and a fuel chamber control valve coil (407) is arranged above the fuel chamber control valve armature (403); a fuel chamber control valve spring (402) is arranged in the fuel chamber control valve coil (407), and the fuel chamber control valve rod (404) penetrates through the armature locating seat (408), and extends into the valve rod locating seat (411); a valve rod fuel inlet line (409) and a valve rod fuel outlet line (410) are arranged in the armature locating seat (408), and the valve rod fuel inlet line (409) is connected with the main accumulator chamber (14) through a first fuel inlet line (18) and a first fuel inlet check valve (17); the valve rod fuel outlet line (410) is communicated with a second fuel inlet line (19), and an upper fuel chamber and a lower fuel chamber are arranged in the middle of the fuel chamber control valve rod (404); the upper fuel chamber is communicated with the lower fuel chamber through a valve rod fuel chamber (405); an auxiliary chamber fuel inlet line (406) is arranged in the valve rod locating seat (411); and the auxiliary chamber fuel inlet line (406) is connected with the auxiliary accumulator chamber (16) through a third fuel inlet check valve (5).

2. The high-pressure common rail fuel injector capable of achieving highly stable injection according to claim 1, wherein the pressure fluctuation absorption assembly (7) comprises a fuel outlet top cap (702), a fuel outlet gasket (703), a piston sleeve (704), a fuel inlet gasket (723) and a fuel inlet top cap (710), and a fuel outlet buffer chamber (712) is formed in the fuel outlet top cap (702); the fuel outlet buffer chamber (712) is connected with the fuel-return accumulator chamber (2) through a buffer chamber fuel outlet passage (701) as well as a fourth fuel inlet check valve and a second fuel-return line (3), and fuel outlets (713) are formed in the fuel outlet gasket (703); fuel inlets (722) are formed in the fuel inlet gasket (723), and a throttle piston (719) and a fixing rod (718) are arranged in the piston sleeve (704); an upper end of the fixing rod (718) is connected with the fuel outlet gasket (703), and a lower end of the fixing rod (718) penetrates through the throttle piston (719) and is connected with the fuel inlet gasket (723); a piston reset spring (717) is coiled around the fixing rod (718), and the fuel outlet gasket (703) and the throttle piston (719) are arranged at two ends of the piston reset spring (717) respectively; a first chamber (721) is formed among the throttle piston, the piston sleeve (704) and the fuel inlet gasket (723), and a second chamber (716) is formed among the throttle piston, the piston sleeve (704) and the fuel outlet gasket (703); piston throttle orifices (720) are formed in the throttle piston, and a fuel inlet buffer chamber (711) is formed in the fuel inlet top cap (710); throttle orifice fuel outlet passages (714) are arranged at an upper end of the piston sleeve (704), and throttle orifice fuel inlet passages (709) are arranged at a lower end of the piston sleeve (704); a first annular chamber (707), a second annular chamber (705), first throttle orifices (708), second throttle orifices (706) and third throttle orifices (715) are formed in the middle of the piston sleeve (704) respectively, and the first throttle orifices (708) are communicated with the first annular chamber (707) and the throttle orifice fuel inlet passages (709) respectively; and the second throttle orifices (706) are communicated with the first annular chamber (707) and the second annular chamber (705) respectively, and the third throttle orifices (715) are communicated with the second annular chamber (705) and the throttle orifice fuel outlet passages (714) respectively.

3. The high-pressure common rail fuel injector capable of achieving highly stable injection according to claim 2, wherein the control valve assembly (8) comprises a control valve upper valve seat (806), a control valve armature (808), a valve rod (803), a control valve lower valve seat (809) and a control chamber top cap (805), and the control valve upper valve seat (806); the control valve armature (808) is located in the control valve lower valve seat (809), and a control valve coil (802) is located in the control valve upper valve seat (806) and located above the control valve armature (808); a control valve reset spring (807) is arranged in the control valve coil (802), and an upper end of the valve rod (803) is connected with the control valve armature (808); a control chamber fuel-return accumulator chamber (810) and a control chamber fuel-return throttle orifice (811) are formed in the control chamber top cap (805), and a lower end of the valve rod (803) is located in the control chamber fuel-return accumulator chamber (810); and a ball valve (804) is arranged between the valve rod (803) and the control chamber fuel-return throttle orifice (811).

4. The high-pressure common rail fuel injector capable of achieving highly stable injection according to claim 3, wherein the nozzle assembly comprises a injector body (906), a needle valve (908), a needle valve locating seat (909), a control sleeve locating seat (903) and a control chamber sleeve (902); the needle valve (908) is located in the control sleeve locating seat (903), the needle valve locating seat (909) and the injector body (906); and a fuel groove (905) is formed between the needle valve (908) and the injector body (906); the fuel groove (905) is communicated with the fuel inlet buffer chamber (711) of the pressure fluctuation absorption assembly (7), and the fuel groove (905) is communicated with the second fuel inlet line (19) through a second fuel inlet check valve (21); the control chamber sleeve (902) is located below the control chamber top cap (805), and a control chamber (901) is formed by the control chamber top cap (805), the control chamber sleeve (902) and the needle valve (908); and a part of the needle valve (908) located in the needle valve locating seat (909) is surrounded by a needle valve spring (904).

5. The high-pressure common rail fuel injector capable of achieving highly stable injection according to claim 4, wherein diameters of the first throttle orifices (708), the second throttle orifices (706) and the third throttle orifices (715) in the piston sleeve (704) are equal.

6. The high-pressure common rail fuel injector capable of achieving highly stable injection according to claim 5, wherein the diameter of the piston throttle orifices (720) is larger than that of the first throttle orifices (708) in side walls of the piston sleeve (704).

7. The high-pressure common rail fuel injector capable of achieving highly stable injection according to claim 6, wherein in case of small pressure fluctuation, fuel in the fuel groove (905) flows into the fuel inlet buffer chamber (711) through the first fuel-return line (10), and flows into the first chamber (721) through the fuel inlets (722); the throttle orifice fuel inlet passages (709) are blocked by side walls of the throttle piston (719), and the throttle orifice fuel inlet passages (709) are not communicated with the first chamber (721); the fuel in the first chamber (721) can only flow into the second chamber (716) through the piston throttle orifices (720) in the throttle piston (719); as a result, the pressure fluctuation of the fuel is absorbed under the buffer action of the inherent mass of the throttle piston (719) and throttling damping action of the piston throttle orifices (720) in the throttle piston (719); and finally the fuel flows into the fuel outlet buffer chamber (712) through the fuel outlets (713), and flows into the fuel-return accumulator chamber (2) through the buffer chamber fuel outlet passage (701) and the second fuel-return line (3).

8. The high-pressure common rail fuel injector capable of achieving highly stable injection according to claim 7, wherein in case of large pressure fluctuation, the fuel in the fuel inlet buffer chamber (711) flows into the first chamber (721) through the fuel inlets (722), and the throttle orifice fuel inlet passages (709) are not blocked by the side walls of the throttle piston (719); the throttle orifice fuel inlet passages (709) are communicated with the first chamber (721), and the fuel flows into the second chamber (716) in two paths; one path of fuel flows into the second chamber (716) through the piston throttle orifices (720) in the throttle piston (719), and the pressure fluctuation of the fuel is absorbed under the buffer action of the inherent mass of the throttle piston (719) and the throttling damping action of the piston throttle orifices (720); the other path of fuel flows into the first annular chamber (707) through the throttle orifice fuel inlet passages (709) and the first throttle orifices (708), and primary absorption of the pressure fluctuation in the fuel line is achieved under the damping action of the first throttle orifices (708); the fuel located in the first annular chamber (707) flows into the second annular chamber (705) through the second throttle orifices (706), and secondary absorption of the pressure fluctuation is achieved under the damping action of the second throttle orifices (706); after completion of secondary absorption of the pressure fluctuation, the fuel flows into the second chamber (716) through the third throttle orifices (715) and the throttle orifice fuel outlet passages (714), and third-time absorption of the pressure fluctuation is achieved under the damping action of the third throttle orifices (715); and finally, the fuel flows into the buffer chamber fuel outlet passage (701) through the fuel outlets (713) communicated with the second chamber (716), and the fuel outlet buffer chamber (712), and flows into the fuel-return accumulator chamber (2) through the second fuel-return line (3).

\* \* \* \* \*